C. J. PETERSON.
Machines for Upsetting Tires.
No. 136,455.　　　　　　　　　　　　Patented March 4, 1873.
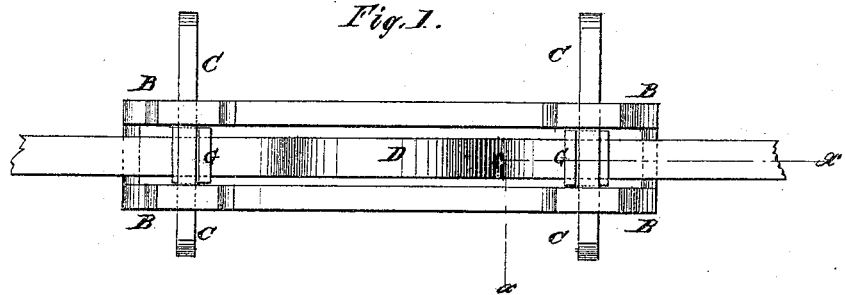
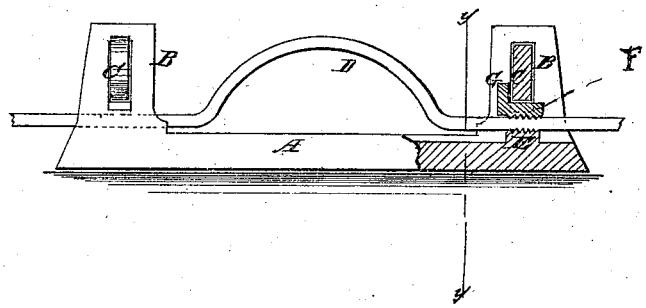
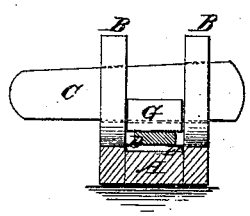
Witnesses:　　　　　　　　　　　Inventor:
　　　　　　　　　　　　　　　　C. J. Peterson
　　　　　　　　　　　　　per
　　　　　　　　　　　　　　　　Attorneys.

UNITED STATES PATENT OFFICE.

CHARLES J. PETERSON, OF BREVARD STATION, NORTH CAROLINA.

IMPROVEMENT IN MACHINES FOR UPSETTING TIRES.

Specification forming part of Letters Patent No. 136,455, dated March 4, 1873.

*To all whom it may concern:*

Be it known that I, CHARLES J. PETERSON, of Brevard Station, in the county of Gaston and State of North Carolina, have invented a new and useful Improvement in Machine for Shrinking Wagon-Tires, of which the following is a specification:

The object of this invention is to provide means for lessening the diameter of a wheel-tire without cutting the tire. The invention is an improvement in machines for shrinking carriage-wheel tires, and relates to the employment of movable jaws having a vertical lip, in combination with fixed jaws on the bed-plate or block, and transverse wedge-bars, which are inserted through vertical slots in stands or arms of the bed-block, as hereinafter shown and described.

In the accompanying drawing, Figure 1 is a top or plan view. Fig. 2 is a vertical section on the line $x\ x$ of Fig. 1. Fig. 3 is a vertical cross-section taken on the line $y\ y$.

Similar letters of reference indicate corresponding parts.

A is a bed-plate having four vertical stands, B, rigidly attached thereto. These stands are sufficiently far apart to admit the tire between them. The stands are arranged in pairs, with a key-hole through each for the reception of the keys C. D represents the tire. E is a jaw at each end, upon which the tire is placed. F is a jaw beneath the keys and on the tire, which is held in place when the tire is operated upon by the lips G, as seen in Fig. 2. The faces of these jaws are serrated, so that when the keys are driven the tire is firmly griped and prevented from slipping. The tire to be upset is bent inward, as seen in Fig. 2, and then fastened by the keys between the jaws; and while hot the bent portion is hammered down flat onto the bed-plate, thus upsetting it. The tire is afterward dressed upon the anvil and applied to the wheel. The bend in the tire before operating with the machine may be more or less according to the amount of upsetting required.

Having thus described my invention, I claim as new and desire to secure by Letters Patent—

The combination of the serrated movable jaws F F having the vertical lips G, with the transverse wedge bars or keys C C inserted through the vertical slots of the stands B B, and the jaws E E formed on the bed-plate A, all as shown and described, for the purpose specified.

CHARLES J. PETERSON.

Witnesses:
F. W. THOMPSON,
T. F. WILKINSON.